United States Patent [19]
Snow et al.

[11] 3,708,758
[45] Jan. 2, 1973

[54] LASER PUMPING APPARATUS

[75] Inventors: Kenneth A. Snow; Richard E. Vandewarker, both of Greece, N.Y.

[73] Assignee: Bausch & Lomb Incorporated, Rochester, N.Y.

[22] Filed: Nov. 27, 1970

[21] Appl. No.: 93,459

Related U.S. Application Data

[63] Continuation-in-part of Ser. No. 748,289, June 29, 1968.

[52] U.S. Cl. ............................................... 331/94.5
[51] Int. Cl. ............................................... H01s 3/09
[58] Field of Search ...331/94.5; 315/235, 240, 241 S

[56] References Cited

UNITED STATES PATENTS

| | | |
|---|---|---|
| 3,178,657 | 4/1965 | Morse ............................... 331/94.5 |
| 3,341,708 | 9/1967 | Bilderback ......................... 331/94.5 |
| 3,351,870 | 11/1967 | Goldsmith et al. ................. 331/94.5 |
| 3,387,227 | 6/1968 | Mastrup et al. .................... 331/94.5 |
| 3,430,159 | 2/1969 | Roeber .............................. 331/94.5 |
| 3,515,938 | 6/1970 | Morse ............................... 331/94.5 |
| 3,626,326 | 12/1971 | Wuerker et al. ................... 331/94.5 |
| 3,633,127 | 1/1972 | Caristi .............................. 331/94.5 |

*Primary Examiner*—William L. Sikes
*Attorney*—Frank C. Parker et al.

[57] ABSTRACT

A circuit is disclosed for generating high voltage, low frequency alternating pulses having a high harmonic content of high frequencies sufficient to energize a gas laser. Two separate conductive electrodes are attached to the exterior of a gas laser tube and are connected to receive the high voltage for exciting and sustaining the operation of the laser.

9 Claims, 6 Drawing Figures

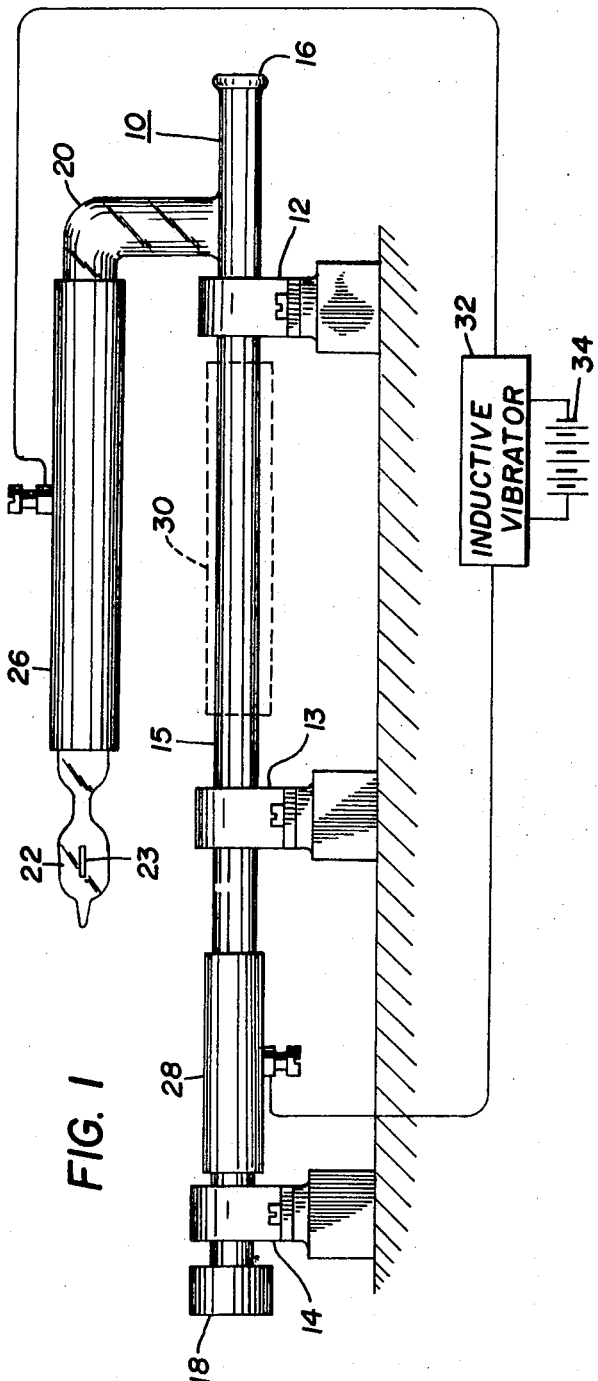
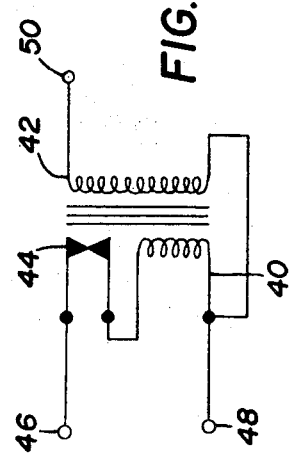
KENNETH A. SNOW
RICHARD E. VANDEWARKER
INVENTORS
BY Charles C. Krauzzok
ATTORNEY

KENNETH A. SNOW
RICHARD E. VANDEWARKER
INVENTORS

KENNETH A. SNOW
RICHARD E. VANDEWARKER
INVENTORS

BY *Charles C. Krawczyk*

ATTORNEY

LASER PUMPING APPARATUS

CROSS-REFERENCES TO RELATED APPLICATIONS

This application is a continuation-in-part of our copending application, Ser. No. 748,289, filed on July 29, 1968, and assigned to the same assignee as the present application.

BACKGROUND OF THE INVENTION

1. Field of the Invention

This invention relates to apparatus for pumping a gas laser.

2. Brief Description of the Prior Art

Presently, laser systems are generally pumped or excited by flash tubes, radio frequency energy or very high voltage direct current potentials. The flash tubes are generally used with solid state lasers while the radio frequency and direct current sources are used with gas lasers.

In the case of the radio frequency pumping sources, a high power oscillator circuit generates electromagnetic signals in the megacycle range. The radio frequency signals are applied to separate conductive collars that surround portions of the laser discharge tube. In the case of the high voltage direct current (DC) power sources (in the order of 1700 volts) the DC potential is generally applied across two electrodes inserted through the laser tube into the gas medium. Both the radio frequency and high voltage sources are individually rather bulky, complicated and expensive, thereby increasing the minimum cost of the laser systems. Furthermore, since the direct current supply is applied to at least one electrode extending through the glass laser tube, the price of the tube itself is higher due to the necessity for providing excellent glass to metal seals and the need for minimizing electrode sputtering, in addition to other requirements. Also, both the direct power supply and radio frequency power supply sources consume a considerable amount of power in their operation. As a result, it is difficult to design such lasers into portable systems since such power sources cannot be practically energized by battery sources for any great length of time. Accordingly, it would be an advantage to provide low cost means for pumping gas lasers without requiring high voltage direct current or radio frequency power source that is particularly adapted for portable use.

A scheme for producing a pulse type laser beam is disclosed in a U.S. Pat. No. 3,351,870, issued to J. Goldsmith et al. and entitled "Pulsed Gas Laser." Here direct current pulses are applied between an external electrode and an internal electrode at a rate so that the time between pulses is sufficient to allow the excited levels in the laser to decay to the ground state before the next pulse is applied. The operation of the laser is based upon the fact that electrons are emitted from the metallic surface of the internal electrode due to the applied electrical pulse to form a free electron cloud into the gas which in turn causes the lasing action. The pulse is a unidirectional, short square wave pulse that requires a substantially shorter rise time than pulse width. As previously set forth, this type of laser and pumping system has the disadvantage of requiring an internal electrode. Furthermore, the pulses are stated to be unidirectional and require a particular shape, i.e. high rise time as compared to width.

SUMMARY OF THE INVENTION

It is therefore an object of this invention to provide a new, low cost system for pumping a gas laser that does not require internal electrodes.

It is still a further object of this invention to provide an inexpensive system for pumping a gas laser that does not require internal electrodes and can provide a substantially continuous laser output.

The pumping system of the invention, includes a circuit for generating low frequency, high voltage alternating pulses that include a high harmonic content of high frequency signals in the megacycle range. The circuit, for example, may comprise an inductive inverter circuit. Two separate external conductors are positioned along different portions of a gas laser. The circuit is connected to apply the high voltage pulses between the two conductors and excite the laser into operation.

BRIEF DESCRIPTION OF THE DRAWINGS

FIG. 1 is an illustration of a laser pumping apparatus according to the principles of the present invention including an inductive vibrator circuit;

FIG. 2 is a schematic diagram of the vibrator circuit of FIG. 1;

DESCRIPTION OF THE PREFERRED EMBODIMENTS

Figure 3:
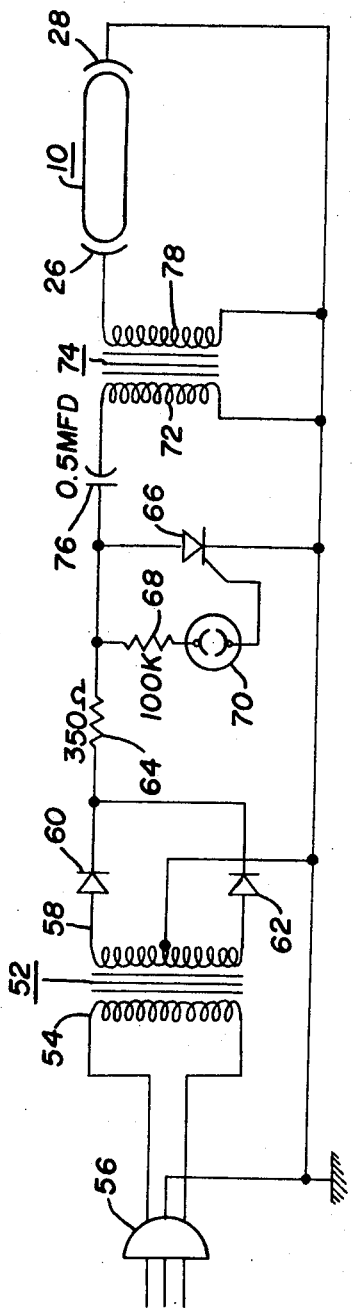
FIG. 3 is a schematic diagram of a semiconductor vibrator circuit that can be substituted for the inductive vibrator circuit of FIG. 1.

The laser pumping circuit of the invention is illustrated as energizing a particular type of helium-neon gas laser, however, it is to be understood that this invention will apply equally well to other types of gas lasers, such as, for example, helium-cadmium, cesium, neon-oxygen, helium-xenon, argon-oxygen. In FIG. 1 an elongated tube 10 composed of Pyrex glass is mounted on three spaced dielectric supports 12, 13 and 14. The tube 10 includes a main cylindrical portion 15 with a double plane mirror 16 at one end and a curved mirror 18 at the opposite end, defining a resonant cavity for a gas laser. A cylindrical side arm 20 projects outwardly from one end of the tube portion 15 to thereafter extend generally parallel to the tube portion 15. A reduced end 22 of the side arm 20 carries a getter 23.

In the particular example, the tube 10 which includes the side arm 20, is filled with a 10:1 mixture of rare isotope helium and neon gas to a total pressure of 2.9 torr. The curved mirror 18 comprises a glass concave mirror coated to be highly reflective with quarter wavelength dielectric layers for a peak reflectivity at 6,328 A. The double plane mirror 16 is separated from the concave mirror by a distance equal to the radius of the concave mirror and also includes a plurality of quarter wavelength layers peaked for maximum reflectivity at 6,328 A. Either, or both the mirror 18 and the mirror 16 can be partly transmissive at the emitted wavelength.

A pair of external electrodes 26 and 28 are mounted along different portions of the tube 10. In the particular example illustrated, the electrode 26 surrounds the tube side arm 20, however, it could also be mounted along the main tube portion 15, as illustrated by the dotted lines 30. The electrodes 26 and 28 are connected to a vibrator inductive inverter circuit 32 of the invention.

In the embodiment of FIG. 1, the inverter circuit 32 is illustrated as a standard Model T spark coil powered by a 6 volt battery 34. A schematic diagram of the spark coil is illustrated in FIG. 2. The spark coil includes a primary winding 40, a high turns ratio step-up secondary winding 42, and a pair of contacts 44 electromagnetically coupled to the primary winding 40. An energizing direct current potential is applied across terminals 46 and 48 and the output voltage is taken from terminals 48 and 50.

When the low voltage source is connected across the terminals 46 and 48, the primary winding 40 is energized until a sufficient field is generated to separate the contacts 44. The field collapses shortly thereafter and the contacts are again closed. The procedure is repeated at a cyclic rate. Accordingly, the primary winding 40 is abruptly energized and de-energized wherein the magnetic field to secondary winding 42 is also abruptly built-up and collapsed thereby developing very high voltage spikes across the terminals 48 and 50, as illustrated as the ringing type alternating pulses in FIG. 5. The output wave forms comprise alternating voltage spikes that are ragged, include steep edges, and are rich in the Fourier spectrum. By alternating, we mean that the polarity of the voltage across the electrodes 26 and 28 reverses. Some of the high frequency components in the alternating pulses are effective to excite the gas in the laser tube. It is believed that the frequencies which excite the gas in the laser tube are in the order of the megacycle range. The output voltage has a peak amplitude in the order of 10,000 volts. The contacts 44 of the spark coil are adjustable to provide a relatively low frequency chopping rate in the range of 80 to 400 cycles per second.

The Model T spark coil has the advantage that it can be readily powered by any 6 volt direct current supply capable of delivering 2.5 – 3.0 amperes of current. This allows a laser system of this sort to be highly portable. The spark coil also has the advantage of being inexpensive, compact and a reliable source of power.

The circuit of FIG. 3 is a second embodiment of a laser pumping circuit of the invention energized from the 60 cycle line mains. The primary winding 54 of an input power transformer 52 is connected to the terminals of an AC power plug 56. The secondary winding 58 of the transformer is connected through a pair of rectifiers 60 and 62 and a current limiting resistor 64 to a semiconductor inductive inverter circuit.

The semiconductor inductive inverter circuit includes a silicon controlled rectifier 66 (SCR) connected between the resistor 64 and the center tap of the secondary transformer winding 58. The gate electrode of the controlled rectifier is connected to the rectifier 64 through a series circuit including a resistor 68 and a trigger device 70, such as a neon bulb or a DIAC. The primary winding 72 of a step-up output transformer 74 is connected in series with a capacitor 76 across the anode and cathode electrodes of the controlled rectifier 66. The secondary winding 78 of the output transformer is connected to the electrodes 26 and 28 of the laser tube 10. The transformer 74 by way of example can be a conventional automobile ignition transformer or coil.

Figure 6:
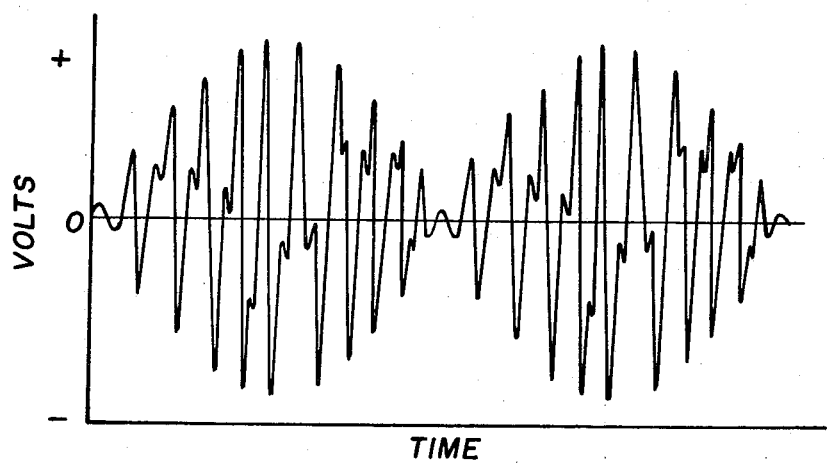
FIG. 6 is a graphic illustration of the high voltage pulses applied to the laser by the apparatus of FIGS. 3 and 4.

The diodes 60 and 62 rectify the input 60 cycle voltage to provide 120 cycle rectified pulses to energize the semiconductor inverter circuit. The capacitor 76 is initially charged through the primary winding 72 until the rectified voltage is of sufficient amplitude to ignite or trigger the neon lamp 70. At that time, the neon lamp fires the controlled rectifier 66, which in turn rapidly switches an effective short circuit across the series circuit including the transformer winding 72 and the capacitor 76. The capacitor 76 is discharged causing a damped oscillation to take place in the circuit. The discharge and the ringing appear across the secondary winding 78 as alternating high voltage spikes, as illustrated in FIG. 6. The amplitude of the voltage spikes across the electrodes 26 and 28 is in the order of 13,000 volts and are also rich in the Fourier spectrum with high frequency components. The damped oscillation also appears across the anode of controlled rectifier 66 causing the device to recover its blocking voltage capability when the voltage reverses polarity.

The rate at which the controlled rectifier is rendered conductive and non-conductive is dependent upon the combination of the size of the resistors 68 and 64, the threshold of the trigger device 70, the inductance of 72, the size of the capacitor 76 and the applied voltage. With the particular component values as disclosed in FIG. 3, the semiconductor vibrator is activated (the controlled rectifier is rendered conductive) at a rate in the order of 2,000 cycles per second. However, the components can be in value to produce a wide range of low frequency cycles, such as, for example, 500 to 15,000 cycles. The amplitude of the output pulses follow the amplitude of the rectified 120 cycle pulses.

Figure 4:
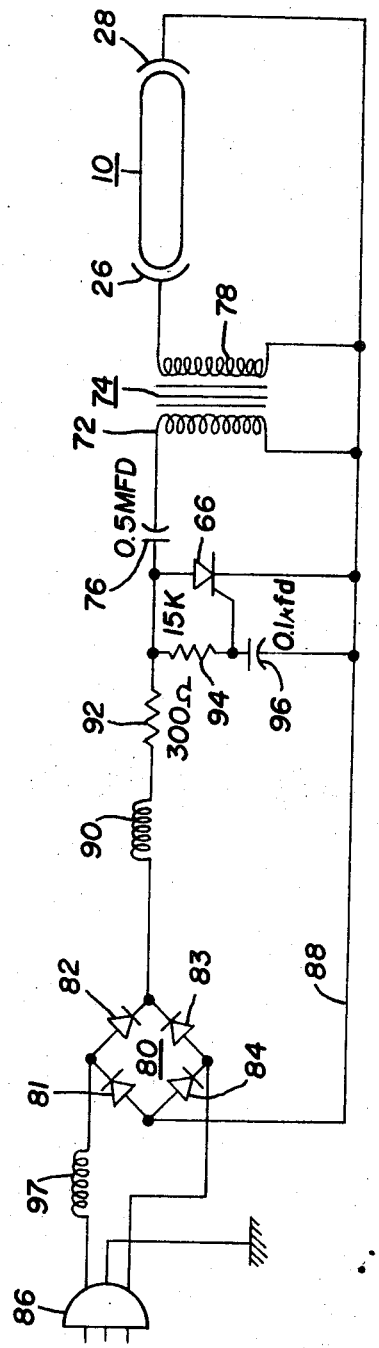
FIG. 4 is a schematic diagram of a modification of the circuit of FIG. 3.

In the circuit diagram of FIG. 4, the supply and firing circuit is changed from that of FIG. 3. For purposes of illustration, the same components connected in the same circuit configuration in FIGS. 3 and 4 are designated by the same reference numbers. In FIG. 4, an inductor 97 is connected to a bridge circuit 80 including the rectifiers 81, 82, 83 and 84 and the combination is connected to the contacts of an AC power plug 86. One diagonal of the bridge circuit 80 is connected to a return lead 88 and the other diagonal to one end of a ballast coil 90. The other end of the ballast coil 90 is connected in series with a current limiting resistor 92 to the anode of the controlled rectifier 66. A phase shift firing circuit is connected between the resistor 92 and the return line 88 including the series resistor 94 and the capacitor 96. The junction of the resistor 94 and the capacitor 96 is connected to the gate electrode of the controlled rectifier 66. The reactor 90 and the resistor 90 may be omitted if the input circuit does not require limiting.

The circuit of FIG. 4 essentially functions in the same manner as that of FIG. 3. The bridge circuit 80 rectifies the 60 cycle line voltage to develop 120 cycle rectified pulses. The controlled rectifier fires whenever the voltage charged across the capacitor 96 reaches the gate firing level, to develop alternating high voltage pulses illustrated in FIG. 6.

Figure 5:
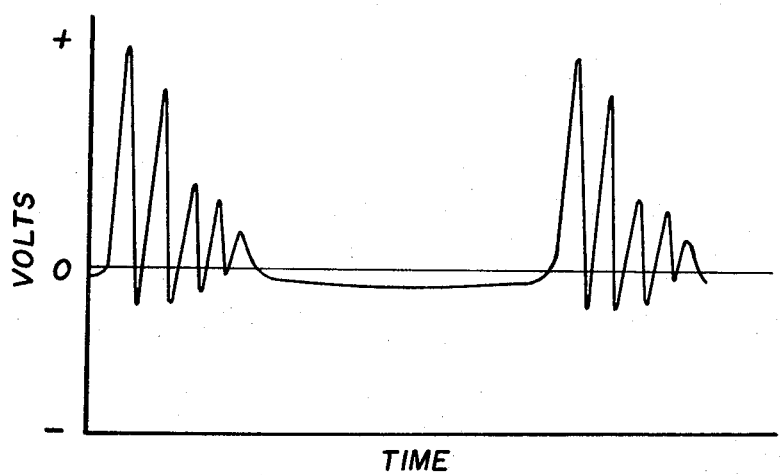
FIG. 5 is a graphic illustration of the high voltage pulses applied to the laser by the apparatus of FIGS. 1 and 2.

It was also found that the laser 10 could also be driven from a conventional television picture tube high voltage power supply that provides the picture tube voltage power supply and also by switching a conventional tesla coil. In all the laser pumping systems specified and as illustrated in FIGS. 5 and 6, the voltage applied to the laser is alternating, irregular, ragged, has steep slopes, and accordingly is rich in high frequency components that provide for the energization of the laser. Since the pumping system disclosed in the present application is not concerned with high amplitude peak operation of the laser, but rather essentially an output that appears to be continuous to an observer, there is no limitation on the repetition rate or amplitudes in the pulses other than operating the laser within its power capability. There is no need to shape the energizing voltage pulses in any particular single form. The only requirement is sufficient amplitude and high content of high frequency components. The repetition rate of the pulses of the peak applied to the electrodes of the laser should be at a sufficient rate so that the output from the laser appears substantially continuous to an observer.

The type of electrodes used with this particular system were found not to be critical. Copper wire, aluminum foil, aluminum backed nylon tape, and aluminum coated surfaces were all found to be useful. However, it was found that the more intimate the contact between the electrode material and the gas, and the greater area of tube covered, the more efficient the coupling. Accordingly, it can be said the larger the diameter of the tube, the more efficient is the coupling. However, since the diameter of the tube is a compromise between mechanical rigidity requirements and maximum coupling, the best coupling in the particular laser disclosed was achieved by making the side arm 20 larger in diameter than the main tube 15 and as long as practical, and wrapping the electrode 26 thereabout. It is likewise desirable to make the other electrode 28 as long as possible and to wrap it around the end of the tube 10 opposite the side arm.

What is claimed is:

1. A power source for a gas laser having electrodes in communication with a lasable gas mixture, comprising:
   a transformer including a primary winding and a secondary winding exhibiting a high step-up turns ratio between the primary winding and the secondary winding, the secondary winding connected to the electrodes;
   input circuit means connected to a source of unidirectional energizing potential and the primary winding for causing current flow through the primary winding;
   switching means including a pair of contacts movable relative to each other, electromagnetically coupled to the primary winding for actuation of the contacts when the current flow through the primary winding reaches a predetermined level; and
   circuit means serially connecting the movable contacts between the input circuit means and the primary winding whereby the contacts operating as a function of the current in the primary winding periodically interrupt the current flow from the source to develop high voltage pulses across the externally disposed electrodes connected to the secondary winding causing the gas mixture to lase.

2. A power source for a gas laser having electrodes in communication with a lasable gas mixture, comprising:
   a transformer including a primary winding and a secondary winding exhibiting a high step-up turns ratio between the primary winding and the secondary winding, the secondary winding connected to the electrodes;
   input circuit means connected between the primary winding and a source of energizing potential;
   a capacitor coupled in series with the primary winding;
   a controlled rectifier having its anode and cathode connected across the series circuit including the capacitor and the primary winding; and
   a trigger circuit coupled to the gate electrode of the controlled rectifier energized through the input circuit means by the source of energizing potential for periodically firing the controlled rectifier and thereby rapidly switching a low impedance path across the serially connected capacitor and the primary winding at a low frequency rate for the secondary winding to develop alternating irregular high voltage pulses having substantially high frequency components in the megacycle range across the electrodes causing the gas mixture to lase.

3. The lasing apparatus as defined in claim 2, wherein:
   the trigger circuit includes a neon lamp.

4. The lasing apparatus as defined in claim 2, wherein:
   the trigger circuit includes a capacitor connected across the gate and cathode of the controlled rectifier.

5. In a gas laser having electrodes in communication with a lasable gas mixture for receiving electrical energy for exciting the gas mixture, an improvement for generating the electrical energy for exciting the gas mixture, the improvement comprising:
   a step-up transformer including a primary winding for inductively coupling a secondary winding which is connected to the electrodes;
   a source of unidirectional electrical energy connected in series with the primary winding; and
   a vibrator connected in parallel with the primary winding of the step-up transformer and the energy source for providing alternating pulses of energy from the energy source to the primary winding at a substantially low frequency to thereby induce in the secondary winding high voltage alternating pulses which include high frequencies in the megacycle range for exciting the gas mixture to lase.

6. The improvement for exciting the gas mixture as defined in claim 5, wherein:
   the vibrator is electromagnetically coupled to the primary winding for providing alternating pulses of electrical energy from the energy source to the primary winding at the substantially low frequency, in a range in the order of 80 to 400 cycles per second.

7. In a gas laser having electrodes in communication with a lasable gas mixture for receiving electrical energy for exciting the gas mixture, an improvement for generating the electrical energy for exciting the gas mixture, the improvement comprising:
- a step-up transformer including a primary winding for inductively coupling a secondary winding which is connected to the electrodes;
- a capacitor connected in series with the primary winding of the step-up transformer;
- a source of unidirectional electrical energy connected in series with the capacitor; and
- a switching circuit connected in parallel with both the energy source, and the capacitor and the primary winding of the step-up transformer for alternately providing a low impedance path across the capacitor for providing alternating pulses of energy from the energy source to the primary winding at a substantially low frequency to thereby induce in the secondary winding high voltage alternating pulses which include high frequencies in the megacycle range for exciting the gas mixture to lase.

8. The improvement for exciting the gas mixture, as defined in claim 7, wherein:
- the switching circuit includes a semiconductor switching device and a trigger circuit for firing the semiconductor.

9. The improvement for exciting the gas mixture, as defined in claim 8, wherein:
- said semiconductor switching device is a controlled rectifier;
- said source provides full wave rectified electrical pulses; and
- said trigger circuit fires said controlled rectifier circuit one or more times for each of said rectified pulses.

* * * * *